2,889,371
Patented June 2, 1959

2,889,371

1,4a-DIMETHYL-1-HYDROXYMETHYLPERHYDRO-6-PHENANTHROL AND ETHERS THEREOF

Roy H. Bible, Jr., Morton Grove, and Willard M. Hoehn, Wilmette, Ill., assignors to G. D. Searle & Co., Chicago, Ill., a corporation of Delaware No Drawing. Application June 7, 1957
Serial No. 664,152

5 Claims. (Cl. 260—611)

The present invention relates to 1,4a-dimethyl-1-hydroxymethylperhydro-6-phenanthrol and to lower alkyl ethers thereof. The compounds of this invention can be represented by the structural formula

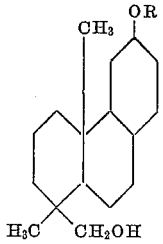

wherein the term R designates hydrogen or a straight-or branched-chain alkyl radical containing fewer than nine carbon atoms.

In one of the methods for the manufacture of compounds of this invention, 1,4a-dimethyl-6-hydroxyperhydrophenanthrene-1-carboxylic acid, or an alkyl ether thereof, is reduced with lithium aluminum hydride in an ethereal solvent, whereby conversion of the carboxylic acid group to a hydroxymethylene group is achieved. This reduction is conveniently accomplished by carrying out the reaction in ethyl ether over a period of several days, followed by decomposing any unreacted lithium aluminum hydride which can be present, washing the ethereal solution with dilute hydrochloric acid, with dilute sodium hydroxide solution and with water, and recovering the reaction product by vaporization of the ether.

In another method for the manufacture of compounds of this invention, podocarpinol or an alkyl ether thereof is catalytically hydrogenated under conditions which cause hydrogenation of the aromatic ring. This reaction can be carried out using a lower alkanoic acid such as acetic acid as a solvent, and platinum oxide as a catalyst. Substantial completion of the hydrogenation reaction can be achieved using a hydrogen pressure of about 500-1000 pounds per square inch and a reaction temperature of about 60-100° C., and continuing the hydrogenation until the consumption of hydrogen after the introduction of fresh portions of catalyst becomes extremely slow, or until a test sample of the reaction mixture shows little ultraviolet absorption characteristic of the aromatic starting material.

As disclosed in greater detail hereinafter, the compositions of this invention, each having newly-introduced asymmetric centers, are capable of existing in a variety of stereoisomeric forms. For their successful employment in the intended applications, complete separation into purified stereoisomers is not necessary. However, representative means are described for providing purified stereoisomers as well as their stereoisomeric mixtures.

The compositions of this invention have useful hormonal and other pharmacological properties. They are valuable anti-inflammatory agents, as shown by their effectiveness in relieving the hyperemia associated with inflammation of the iris. In this respect they resemble the adrenocortical hormones, although they do not exhibit the manifold range of side actions shown by the natural hormones.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (°C.), distillation pressures in millimeters (mm.) of mercury, and quantities of materials in parts by weight.

*Example 1*

In a medium pressure hydrogenation vessel, a mixture of 50 parts of 1,4a-dimethyl-1-hydroxymethyl-6-methoxy-1,2,3,4,4a,9,10,10a-octahydrophenanthrene (O-methylpodocarpinol), 470 parts of acetic acid and 1 part of platinum oxide catalyst is stirred for 2 hours at a temperature of about 80–90° C. and under a hydrogen pressure of about 700–900 pounds per square inch. The cooled mixture is filtered, and the filtrate is returned to the hydrogenation vessel with one part of fresh platinum oxide catalyst. Hydrogenation is continued for an additional 4 hours (or until the consumption of hydrogen becomes extremely slow) at a temperature of about 80–90° C. and a hydrogen pressure of about 600 pounds per square inch. The cooled mixture is filtered, and the filtrate is brought to dryness by distillation under reduced pressure. (The residue is analyzed for any remaining starting material by determining the ultraviolet absorption spectrum of a methanolic solution containing 0.2 gram of the residue per liter of solution. If the spectrum displays any appreciable peak near 280 millimicrons, the hydrogenation step is repeated.) The residue is heated under reflux for 4 hours with a mixture of 50 parts of potassium hydroxide, 50 parts of water and 160 parts of methanol. This mixture is then diluted with several times its volume of water, and extracted with ether. The ethereal solution is washed with water to neutrality, rendered anhydrous, and brought to dryness by vaporization of the solvent. The residue is dissolved in the minimum quantity of a 10 volume percent solution of benzene in petroleum ether, and poured on a chromatography column prepared from 5000 parts of alumina. The column is eluted with mixtures of benzene and petroleum ether containing gradually increasing proportions of benzene, with benzene, and with benzene containing very small proportions of ethyl acetate. Stereoisomeric forms of 1,4a-dimethyl-1-hydroxymethyl-6-methoxyperhydrophenanthrene are eluted from the column at a satisfactory rate with benzene and with a 2 volume percent solution of ethyl acetate in benzene. The crystalline materials eluted in this manner can be combined and distilled using a short-path distillation apparatus. The material distills, accompanied by some sublimation, at about 140–150° C. at about 0.06 mm. pressure. The distillate exhibits prominent infrared absorption maxima at about 2.8, 9.1, and 9.8 microns. The products obtained by the foregoing procedure are commonly stereoisomeric mixtures, suitable for use without further separation into their components. By careful rechromatography on silica gel, an individual stereoisomer can be obtained. This isomer, crystallized from aqueous methanol, melts at about 80.5–85° C. and has a specific rotation of about −40° in ethanol solution. The stereoisomeric forms of 1,4a-dimethyl-1-hydroxymethyl-6-methoxyperhydrophenanthrene have the structural formula

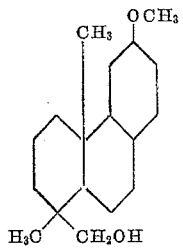

Example 2

Over a period of about 30 minutes, a slurry of 5 parts of 1,4a - dimethyl - 6 - hydroxyperhydrophenanthrene-1-carboxylic acid in 115 parts of anhydrous ether is added to a slurry of 3 parts of lithium aluminum hydride in 70 parts of anhydrous ether. Throughout the period of addition the reaction mixture is stirred and maintained at about 0–10° C. It is allowed to warm to room temperature and then maintained at about 25° C., with occasional stirring, for 8 days. There are successively added, with efficient stirring and cooling, 27 parts of ethyl acetate, 20 parts of 50% aqueous ethanol, 10 parts of water, and 100 parts of 10% hydrochloric acid. The separated ethereal phase is washed with 10% hydrochloric acid, with water, with several portions of 10% sodium hydroxide solution, and finally with water to neutrality. Unreacted starting material which can be present is recovered by acidification of the basic washings. The ethereal solution is rendered anhydrous and brought to dryness by vaporization of the solvents. Purification of the residue by crystallizations from aqueous methanol and from a mixture of ethyl acetate and petroleum ether, followed by sublimation or evaporative distillation at about 170–180° C. at 0.04 mm. pressure affords 1,4a-dimethyl-1 - hydroxymethylperhydro - 6 - phenanthrol in a stereoisomeric form melting at about 120–123° C. This compound has a specific rotation of about −52° in ethanol solution, and exhibits infrared absorption maxima at about 2.96, 9.38, and 9.65 microns. The structural formula is

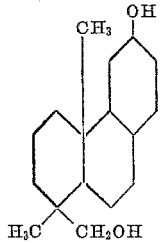

Another stereoisomer, which can be obtained by hydrogenating a corresponding 1-hydroxymethyl-1,2,3,4,4a,9,10,10a-octahydrophenanthrene derivative according to the process of Example 1, melts at about 223.5–228° C. and has a specific rotation of about +14° in ethanol solution. Infrared absorption maxima for this stereoisomer appear at about 3.05, 9.22, and 9.62 microns.

Example 3

To a solution of 400 parts of methyl podocarpate and 120 parts of sodium hydroxide in 1100 parts of water and 1600 parts of 95% ethanol is added all at once 330 parts of diethyl sulfate. The reactants are quickly mixed and then allowed to stand until a thick white precipitate forms. This precipitate is collected on a filter, washed with dilute ethanol, and recrystallized from methanol to yield methyl O-ethylpodocarpate as thin, colorless needles melting at about 144–147.5° C.

Lithium aluminum hydride (20 parts) is cautiously added, with stirring, to 530 parts of anhydrous ether. The stirred mixture is heated under reflux for 2 hours after the addition of the lithium aluminum hydride is complete, after which it is cooled to about 0–10° C. and maintained in this temperature range while a solution of 79.5 parts of methyl O-ethylpodocarpate in 450 parts of anhydrous benzene is gradually added. When the addition is complete, the stirred reaction mixture is heated under reflux for 3 days. It is again cooled to about 0–10° C., and gradually treated with a total of 135 parts of ethyl acetate. Particular caution is required at this stage as the mixture can become very difficult to stir. It is then allowed to stand at about 25° C. for 18 hours. With external cooling, 20 parts of water is cautiously added. When the reaction ceases an additional 200 parts of water is added and after thorough mixing, the ethereal solution is separated and combined with ether extracts of the aqueous phase and insoluble material. The combined ethereal solution is washed with several portions of 10% sodium hydroxide solution and then with water until the washings are neutral. The ethereal solution is rendered anhydrous, and the ether is removed by distillation. The residue obtained is 1,4a-dimethyl-1-hydroxymethyl-6-ethoxy-1,2,3,4,4a,9,10,10a - octahydrophenanthrene (O-ethylpodocarpinol), suitable for use without further purification. If desired, this compound can be distilled at a boiling point of about 150° C. at about 0.1 mm. pressure. The structural formula is

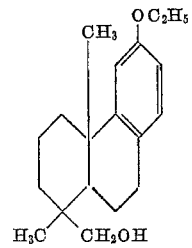

Example 4

Forty parts of 1,4a-dimethyl-1-hydroxymethyl-6-ethoxy-1,2,3,4,4a,9,10,10a-octahydrophenanthrene is hydrogenated according to the process of Example 1, employing fresh portions of platinum oxide catalyst until the residue obtained by evaporation of a small portion of the reaction mixture does not exhibit substantial selective ultraviolet absorption in the vicinity of 280 millimicrons. The entire mixture is then filtered, and the residue obtained after distillation of the acetic acid is heated under reflux for 4 hours with a mixture of 50 parts of potassium hydroxide, 50 parts of water and 160 parts of methanol. The cooled mixture is diluted with 600 parts of water and extracted with several portions of ether. By distillation of the dried ethereal solution, the crude product is obtained as a non-volatile residue. This residue, dissolved in the minimum quantity of a 10 volume percent solution of benzene in petroleum ether, is fractionated by pouring it on a chromatography column prepared from 4000 parts of alumina and eluting the column with mixtures of benzene and petroleum ether containing gradually increasing proportions of benzene, with benzene, and with benzene containing up to a few percent of ethyl acetate. Stereoisomeric forms of 1,4a-dimethyl-1-hydroxymethyl - 6 - ethoxyperhydrophenanthrene are eluted from the column at a satisfactory rate with benzene and with solvent mixtures comprising benzene and small amounts of ethyl acetate. The crystalline products so obtained, which exhibit infrared absorption peaks at about 2.9, 9.2, and 9.7 microns, are commonly stereoisomeric mixtures, suitable for use without further separation into their components. The stereoisomeric forms of 1,4a - dimethyl - 1 - hydroxymethyl - 6 - ethoxyperhydrophenanthrene have the structural formula

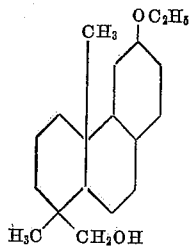

What is claimed is:
1. A compound of the structural formula

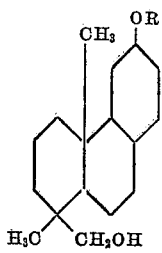

wherein R is a member of the class consisting of hydrogen and lower alkyl radicals.
2. 1,4a - dimethyl - 1 - hydroxymethylperhydro - 6-phenanthrol.
3. 1,4a-dimethyl-1-hydroxymethyl - 6 - (lower alkoxy) perhydrophenanthrene.
4. 1,4a - dimethyl - 1 - hydroxymethyl - 6 - methoxyperhydrophenanthrene.
5. 1,4a - dimethyl - 1 - hydroxymethyl - 6 - ethoxyperhydrophenanthrene.

References Cited in the file of this patent
UNITED STATES PATENTS 2,705,725 Bible et al. _____ Apr. 5, 1955
2,796,431 Bible et al. _____ June 18, 1957